June 16, 1953 W. E. LASKY ET AL 2,642,478
WATER DETECTOR
Filed Dec. 29, 1949 2 Sheets-Sheet 1

Inventors
Wayne E. Lasky
Russell W. Seniff
By The Firm of Charles H. Will Attys

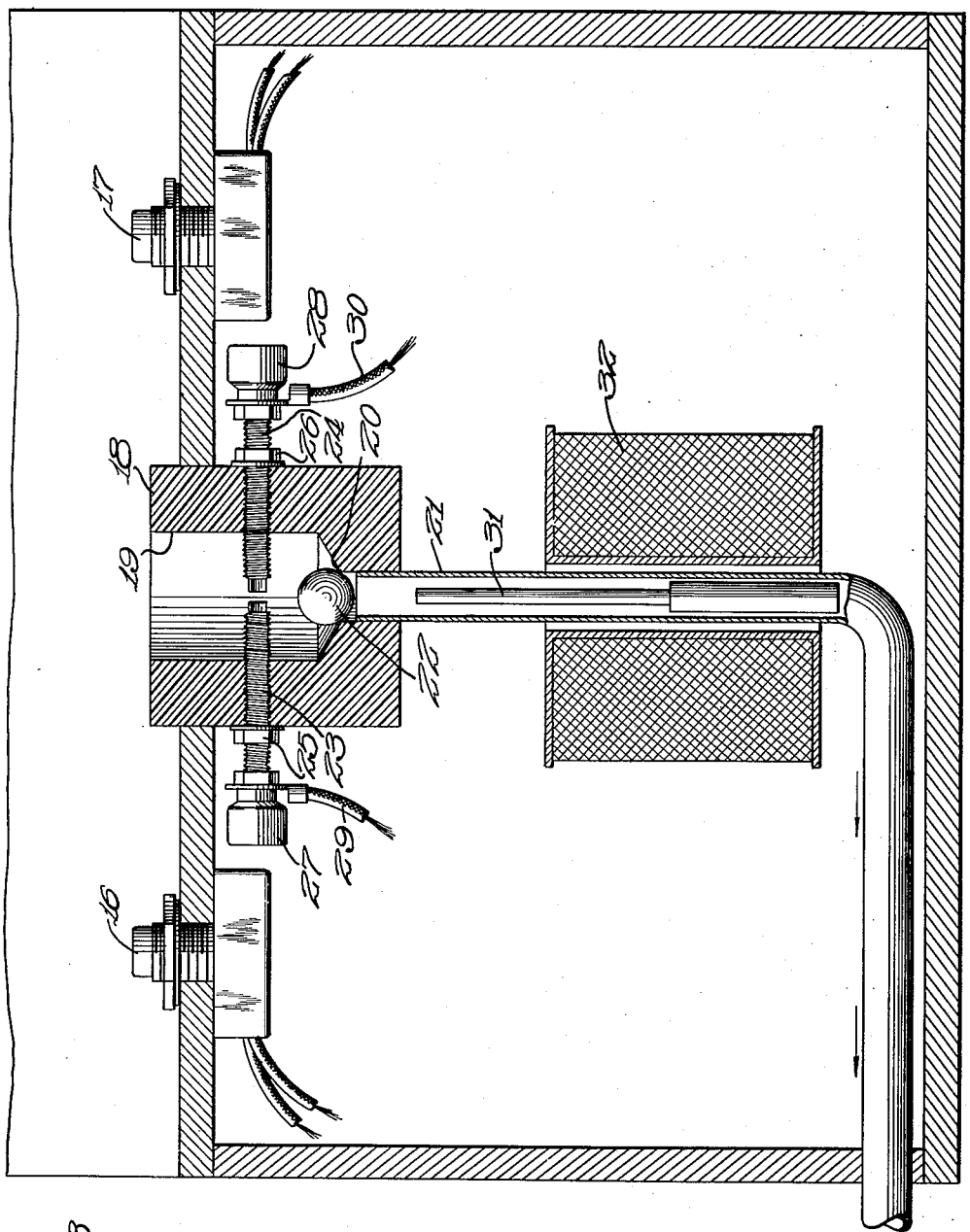

Patented June 16, 1953

2,642,478

UNITED STATES PATENT OFFICE 2,642,478

WATER DETECTOR

Wayne E. Lasky, Bloomington, Ill., and Russell W. Seniff, Baltimore, Md., assignors of one-fourth to Melvin A. Hanson and one-fourth to Harry E. Frank, both of Bloomington, Ill.

Application December 29, 1949, Serial No. 135,656

3 Claims. (Cl. 175—183)

The present invention relates to a method for determining water content in petroleum products, such as crankcase oils, lubricating oils, and fuels such as diesel fuel oil, kerosene, and other relatively non-conductive liquids.

In addition, the invention provides an apparatus for efficiently carrying out the novel method.

Quality control of crankcase lubricating oils, and the like, with respect to their water content is an extremely important consideration in the efficient maintenance of modern internal-combustion automotive, locomotive, marine and stationary engines. The presence of even small amounts of water in lubricating oil systems frequently results in costly and sometimes irreparable damage to the engine, necessitating prolonged and expensive repairs.

Most railroads have initiated some procedure for periodically testing the quality of diesel crankcase oils in locomotive engines in an attempt to avoid the possibility of operating engines with a lubricating oil having an abnormally high water content. In the normal procedure for such quality control, a sample of the crankcase oil used in the locomotive engine is shipped to a laboratory station for testing. This procedure has the serious drawback that a considerable delay is necessarily present in transmitting the sample to the laboratory and in receiving the results of the test made. The most convenient method for making such quality tests would be one which could be used on the spot at any regular stop of the locomotive, and could be performed in a matter of a few minutes so that water leaks could be repaired and oil changes could be made, if necessary, before the locomotive proceeds.

An object of the present invention, therefore, is to provide a method for determining the relative amounts of water in petroleum products, such as crankcase oils, diesel fuel oils, and the like, in an efficient and rapid manner.

Another object of the present invention is to provide a method for testing quality of petroleum products which may be operated by unskilled help without the necessity of using costly laboratory equipment.

A further object of the present invention is to provide an apparatus for carrying out quality tests on petroleum products of the type mentioned above.

A further object of the present invention is to provide an apparatus for testing the relative amount of water in such petroleum products, the apparatus being so designed and constructed that it is economical to install, compact, and simple to operate.

The method of the present invention comprises providing a sample of the petroleum product to be tested, passing an electric current through the sample, registering the current flow through the sample, and using this current determination as an indication of the relative amount of water in the sample. In the apparatus of the present invention, means are provided for indicating directly the usability of the oil being tested. In addition, means are provided for draining the oil quickly from the test apparatus upon the completion of a test so that a large number of samples can be tested within a very short time.

As an indicating means of the present invention, we prefer to use a neon or other gas-filled tube in series with the electrodes, so that by observing the relative intensity of illumination of the tube, the observer can approximate the percentage of water content in the sample being tested. It will be understood, however, that various other indicating means such as an ammeter, voltmeter, or suitable audible means, or observation of reaction between electrodes, can be provided as an indication of the amount of current flow through the circuit.

A further description of the present invention will be made in connection with the attached sheets of drawings, in which:

Figure 3 is a cross-sectional view with parts in elevation taken substantially along the line III—III of Figure 1.

As shown on the drawings:

Figure 1:
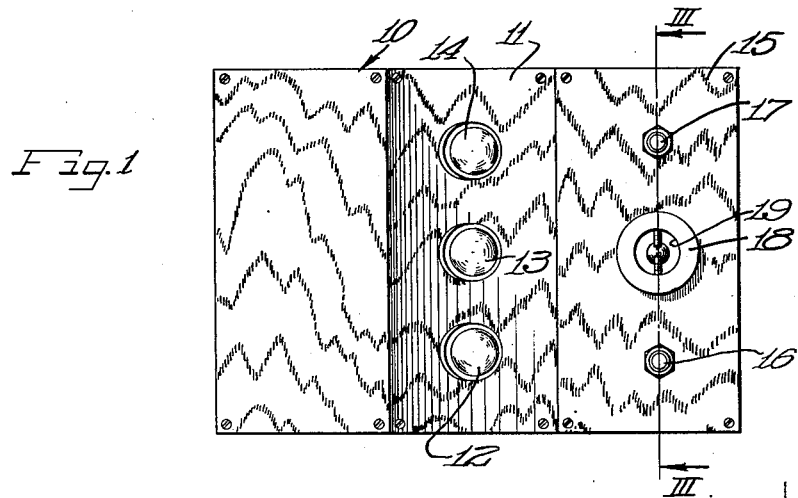
Figure 1 is a plan view of the assembly of a testing device of the type described in the present invention.

Reference numeral 10 denotes generally a housing for the test equipment of the present invention, preferably made of light-weight material such as wood or sheet metal. A slanted instrument panel 11 forms the mid-section of the assembly, and the instrument panel 11 carries bull's-eye lenses 12, 13 and 14, under which indicating lamps are disposed, the purpose of which will be hereinafter more fully described.

A horizontal panel 15 is provided at the front of the housing 10, including switches 16 and 17 and a receptacle 18 for the sample of oil being tested.

Referring to Figure 3, it will be seen that the receptacle 18, which is preferably composed of a non-conducting plastic material, as for instance, a methylacrylate resin such as Lucite, has a bore 19 provided therein, which is tapered inwardly at its lower extremity to provide a restricted port 20. The outlet port should be located below the level of the liquid in the receptacle 18 to avoid the entrapment of air bubbles which could give rise to spurious readings. The bore 19 is in communication with a conduit 21 which is connected to a vacuum pump or other source of vacuum (not shown). The bore of the receptacle 18 is normally closed by means of a ball 22 seated against the edge of the port 20, although other types of closure members may be used as well.

The receptacle 18 is provided with a pair of threaded electrodes 23 and 24 which pass through threaded holes in the receptacle 18 and are held with their ends in opposed spaced relation within the receptacle by means of their respective lock nuts 25 and 26. To regulate the gap between the ends of the electrodes 23 and 24, a pair of adjusting heads 27 and 28 are provided on the outer exposed ends of the electrodes 23 and 24. The electrodes 23 and 24 are supplied with a source of high voltage, alternating current by means of a pair of conducting wires 29 and 30 which are energized from a high potential source.

As best seen in Figure 3, a pair of push-button switches 16 and 17 are provided on either side of the receptacle 18 to complete the switch panel.

To provide quick-acting means for unseating the ball 22, and thus permit drainage of the oil sample contained within the receptacle 18 after the completion of a test, a plunger 31, disposed within the conduit 21, and a solenoid 32 are provided. Upon energization of the solenoid, the plunger 31 is forced upwardly until its end contacts the ball 22 and unseats it. The unseating of the ball 22 permits the flow of oil contained in the receptacle 18 to the evacuated conduit 21 and affords a means of quickly draining the oil sample from the receptacle 18 upon a completion of a test. Upon deenergization of the solenoid, the plunger 31 is returned to its normal position shown in Figure 3, and the ball 22 reseats itself in the port 20 of the receptacle 18.

Figure 2:
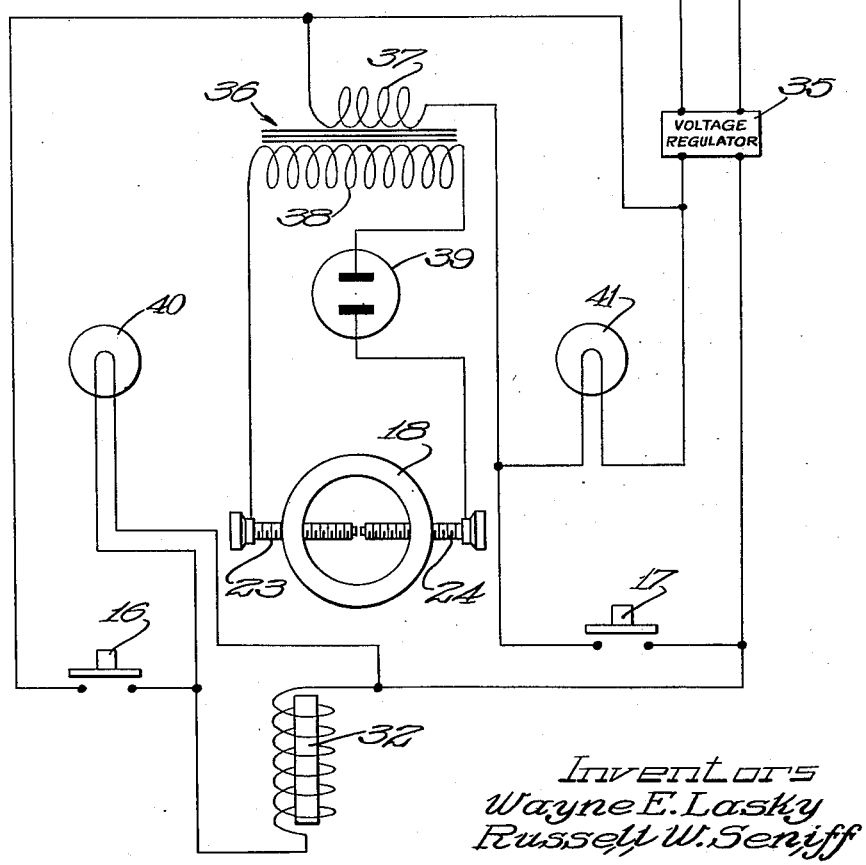
Figure 2 is a wiring diagram of the electrical circuit of the testing device.

Considering next the wiring diagram shown in Figure 2, it will be seen that a source of A.-C. potential, represented by lines 33 and 34, is preferably fed to a voltage regulator 35 to assure that a constant voltage is always impressed on the test apparatus. The primary 37 of a step-up transformer 36 is energized from this voltage regulator 35, by closing the switch 17 in series with the line 34. An indicator lamp 41 disposed under lens 14 is also energized upon energization of the primary 37.

The secondary winding 38 of the transformer 36 supplies a high potential alternating current to the electrodes 23 and 24, which are immersed in the oil being tested in the receptacle 18. To detect the relative value of the current flowing through the circuit, an indicating device, such as a neon tube 39 disposed under lens 13, is provided in series with the high potential lead.

By properly calibrating the apparatus, the extent of activation, if any, or the non-activation of the neon tube 39 can be made to serve as an indication of whether or not the oil being tested is usable. As a specific example of the use of our apparatus, a secondary potential of 10,000 volts was employed, with the electrodes 23 and 24 $\frac{1}{8}''$ in diameter and spaced $\frac{1}{16}''$ apart. A line voltage of 110 volts was impressed upon the primary 37. Under these conditions, upon holding the switch 17 closed for 10 seconds, the test lamp 39 did not light up when the water content of the oil was less than $\frac{1}{100}$ of 1% by weight. However, when the water content ranged from $\frac{1}{100}$ of 1% to 1% by weight, the neon tube 39 over the 10-second period was energized intermittently at varying intensities. Where a sample of oil containing more than 1% water was employed, continuous energization of the neon tube 39 resulted.

Thus, after standardizing upon the spacing between the ends of the electrodes 23 and 24 and the voltage derived from the secondary 38 of the transformer 36, the apparatus can be calibrated against standard samples of oil of known water content so that an experienced operator can determine with approximate accuracy the water content in an unknown sample of oil. Conveniently, the spacing of the electrodes 23 and 24 and/or the value of the impressed voltage may be adjusted while an oil sample having a water content barely exceeding the maximum permissive water content is in the receptacle 18, so that continuous energization of the neon bulb 39 will result under these conditions. Successive samples of oil may then be analyzed by merely observing whether or not these samples cause continuous energization under the same conditions.

As an aid in approximating the actual water content of any given oil sample, where the content is less than 1% by weight, an operator will also soon be able to distinguish the varying amounts of disturbance in the oil as evidenced by evolution of vapors, and in this way will be able to give an approximation of the actual amount of water present.

The circuit to the primary 37, controlled by switch 17, is normally kept energized for a period of about 10 seconds. After the test has been completed, and another test is to be run, the push-button switch 17 is released and switch 16 is closed. The closing of the switch 16 energizes the solenoid 32 as well as an indicator lamp 40 located under the lens 12. Energization of the solenoid moves the plunger 31, previously described, into engagement with the ball 22, unseating the same, and permitting withdrawal of the oil sample through the vacuum conduit 21. This completes the cycle of operation, and a new oil sample may then be poured into the receptacle 18. If the previous sample tested was found to be substantially contaminated with water, it is desirable to wash the interior of the receptacle 18 with dry oil or a solvent such as alcohol to completely eliminate any traces of the water present.

From the foregoing, it will be apparent that we have herein provided a simple and yet efficient method for quickly determining the relative amount of water in a sample of petroleum oil. The apparatus which we have provided to carry out this method is simple in construction, compact, portable, and easy to manipulate.

It will be understood that modifications and variations may be effected without departing from the scope of the novel concepts of the present invention.

We claim as our invention:

1. An apparatus for determining the relative amount of water in petroleum oil which comprises a receptacle for said oil, a pair of spaced electrodes within said receptacle arranged for immersion within the oil being tested, means for electrically energizing said electrodes, indicating means for registering variations in current flow between said electrodes, a conduit connected to a source of vacuum extending from said receptacle, a ball seated at the base of said receptacle, a plunger within said conduit for unseating said ball, and a solenoid for moving the plunger into engagement with said ball to unseat the same and draw oil from said receptacle into said conduit.

2. An apparatus for determining the relative amount of water in petroleum oil which comprises a receptacle for said oil, a pair of spaced electrodes within said receptacle arranged for immersion within the oil being tested, means for varying the gap between said electrodes, means for electrically energizing said electrodes, means for indicating current flow between said electrodes, a conduit connected to a source of vacuum extending from the base of said receptacle, a ball seated at the base of said receptacle, a plunger within said conduit for unseating said ball, and a solenoid for moving the plunger into engagement with said ball to unseat the same and draw oil from said receptacle into said conduit.

3. An apparatus for determining the relative amount of water in a relatively non-conductive fluid which comprises a receptacle for said fluid having a tapered bore forming a restricted port, a ball seated in said port, a pair of spaced electrodes within said receptacle arranged for immersion within the fluid being tested, means for varying the gap between said electrodes, a source of high potential alternating voltage energizing said electrodes, a neon lamp in series with said electrodes for indicating current flow between said electrodes, a conduit connected to a source of vacuum extending from said port, a plunger within said conduit for unseating said ball, and a solenoid disposed about said conduit for moving the plunger into engagement with said ball to unseat the same and draw fluid from said receptacle into said conduit.

WAYNE E. LASKY.
RUSSELL W. SENIFF.

References Cited in the file of this patent

UNITED STATES PATENTS

| Number | Name | Date |
| --- | --- | --- |
| 1,734,342 | Perry | Nov. 5, 1929 |
| 1,774,319 | Crockatt | Aug. 26, 1930 |
| 1,913,436 | Eckstein | June 13, 1933 |
| 1,995,492 | Andrus et al. | Mar. 26, 1935 |
| 2,376,694 | Hewlett | May 22, 1945 |